(No Model.)
G. A. RUNYAN.
CORNSTALK RAKE.
No. 295,054. Patented Mar. 11, 1884.
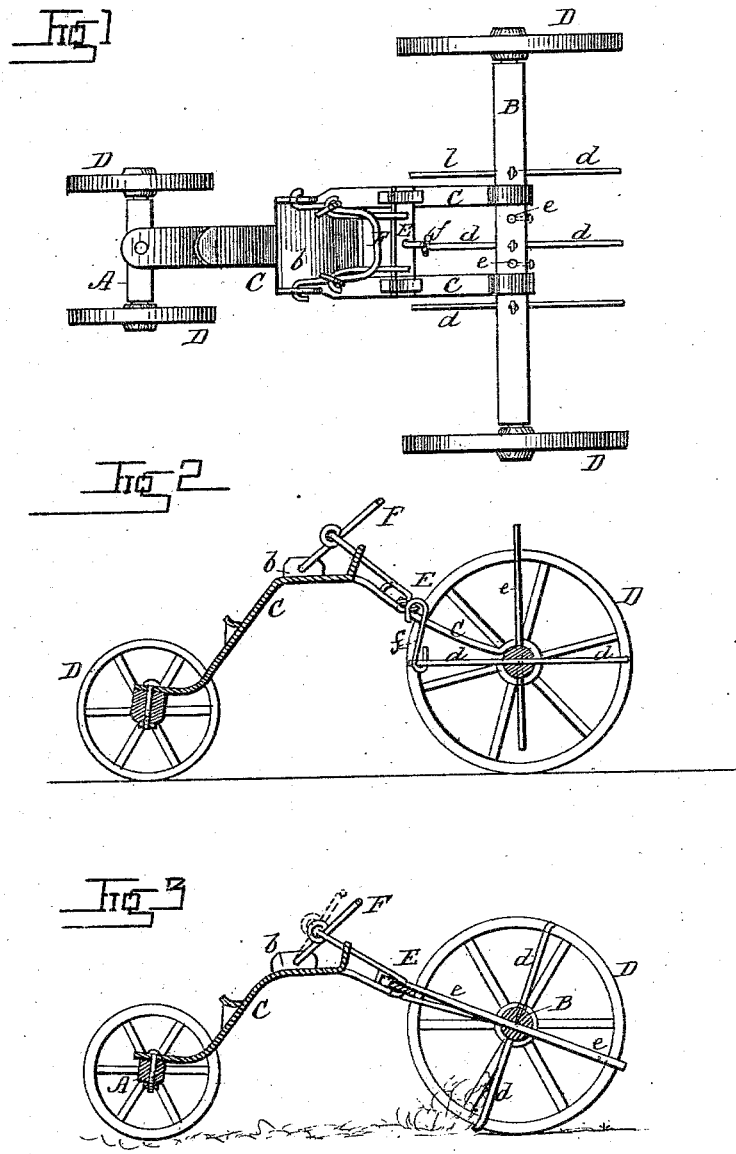
WITNESSES:
INVENTOR:
G. A. Runyan
BY Munn & Co.
ATTORNEYS.

UNITED STATES PATENT OFFICE.

GEORGE ARTHUR RUNYAN, OF AUGUSTA, KANSAS.

CORNSTALK-RAKE.

SPECIFICATION forming part of Letters Patent No. 295,054, dated March 11, 1884.

Application filed June 9, 1883. (No model.)

*To all whom it may concern:*

Be it known that I, GEORGE ARTHUR RUNYAN, a citizen of the United States, residing at Augusta, in the county of Butler and State of Kansas, have invented a new and useful Improvement in Cornstalk-Rakes, of which the following is a specification.

My invention is an agricultural machine, which, while adapted for marking by reason of the provision of four transporting-wheels arranged in pairs in a particular manner, has a raking attachment that may be locked or held out of action at will by means hereinafter described, and specifically indicated in the claim.

In the accompanying drawings, Figure 1 is a plan view, and Fig. 2 a central longitudinal section, of the machine adjusted for use as a marker. Fig. 3 is a central longitudinal section of the machine when adjusted for use as a raker.

The letter A indicates the front axle, and B the rear axle, which are connected by means of an upwardly-curved reach, C, that is pivoted to the front axle. The latter is about one-third the length of the rear one, and each has wheels D D, which serve as markers to lay off the ground in rows at such distance apart as it is usual to plant corn in rows and various other crops which require cultivation while growing. Thills or a pole may be hinged to the front axle, A, to provide for hauling and guiding the machine by means of a team. The upward curve of the reach C allows the front wheels to pass under it, so that the machine may be turned about in a narrow space.

The driver's seat $b$ is located on the summit of the curve, so that he may obtain a good view of the field.

When the machine is used as a marker, the rear axle, B, is not allowed to revolve, and the rake-teeth $d$ must be kept in a horizontal position, so as to not touch the ground; but to convert it into a raker adapted for gathering cornstalks, the axle B is locked by means of an adjustable stop, E, which consists of a bar adapted to slide on the bifurcated arms of the reach C in suitable guides in rear of the driver's seat. The said stop E is connected by links with a bow-shaped lever, F, pivoted to the driver's seat and adapted to serve as a "lazy-back" for the latter. By inclining his body forward and drawing lever F in the same direction, the stop-lever E may be adjusted to bring it out of contact with the tilting pins $e$, fixed in the rake-head, and thus permit its rotation at will; but when the driver sits erect or leans back, the lever F is tilted backward and the stop E forced down and held engaged with said pins $e$, so that the rake is prevented from revolving, as shown in Fig. 3. These pins $e$ are longer than the rake-teeth $d$ and project on opposite sides of the axle B at right angles to the two opposite rows of rake-teeth $d$. Thus in practical operation, when the rake-teeth $d$ have gathered sufficient hay for a windrow, the driver draws the slide or stop E forward, and thereby removes it from engagement with the stop-pins $e$, so that the axle is allowed to revolve a half-revolution, or until again arrested by engagement with the stop-pins $e$.

When the machine is used as a marker, the rear axle, B, with its attachments, may be removed and another without such attachments substituted; but, instead of removing the axle, I prefer to adjust the tilting pins $e$ and lock the axle B, as shown in Figs. 1 and 2, so that it cannot revolve—that is to say, the tilting pins $e$ are drawn upward so as to clear the ground, (they being held by set-screws,) and to employ a hook, $f$, for holding the rake-teeth $d$ in a horizontal position. Said hook $f$ is pendent from the slide or stop E, and engages with the middle tooth of a row. Thus the rake-teeth are held out of action and the machine can be used as a marker alone.

What I claim is—

The combination of the bow-lever F, pivoted to the rear of driver's seat, the links, and sliding stop E with the revoluble rake-head having devices adapted to engage with said stop, as shown and described.

GEORGE ARTHUR RUNYAN.

Witnesses:
JOHN REID,
C. H. MERRITT.